United States Patent [19]

Karasudani

[11] 4,265,342
[45] May 5, 1981

[54] DISC BRAKE ASSEMBLY WITH TORQUE ABSORBING BRACKET

[76] Inventor: Yasuo Karasudani, 4309 Akuwa-cho, Seya-ku, Yokohama-shi, Kanagawa-ken, Japan

[21] Appl. No.: 30,651

[22] Filed: Apr. 16, 1979

[30] Foreign Application Priority Data

Apr. 19, 1978 [JP] Japan .................................. 53-51576

[51] Int. Cl.³ .............................................. F16D 65/00
[52] U.S. Cl. .................................................... 188/73.6
[58] Field of Search .................... 188/73.3, 73.4, 73.5, 188/73.6, 72.5, 72.4

[56] References Cited

U.S. PATENT DOCUMENTS 3,712,422  1/1973  Haraikawa et al. ............. 188/72.5 X

FOREIGN PATENT DOCUMENTS 1264891  3/1968  Fed. Rep. of Germany .
2616913  10/1976  Fed. Rep. of Germany .
1375697  11/1974  United Kingdom .................... 188/73.4
1545825  5/1979  United Kingdom .

*Primary Examiner*—Douglas C. Butler
*Attorney, Agent, or Firm*—Wenderoth, Lind & Ponack

[57] ABSTRACT

The invention relates to disc brake assembly including a stationary bracket, a pair of friction pads disposed on the opposite surfaces of a rotatable disc, a pair of parallel pins secured to the bracket and extending in the direction of the axis of the disc, a caliper slidably supported on the pins and having therein a hydraulic piston acting on one of the friction pads to apply it against one surface of the disc, and a leg portion of the caliper extending across and straddling a portion of the circumference of the disc to apply the other friction pad against the other surface of the disc. The bracket is formed to straddle the disc so as to directly receive braking torque generated in the friction pads. An opening is formed in the caliper for allowing the friction pads being extracted therethrough in the radially outward direction, and a pair of parallel pins is mounted on the caliper to extend across the opening to slidably support the friction pads.

2 Claims, 10 Drawing Figures

DISC BRAKE ASSEMBLY WITH TORQUE ABSORBING BRACKET

BACKGROUND OF THE INVENTION

This invention relates to disc brakes and, particularly, to improvements in so-called floating caliper type disc brakes.

Floating caliper type disc brakes essentially comprise a bracket secured to a non-rotatable part such as a wheel supporting member or the like of a vehicle, a pair of friction pads opposingly disposed on the opposite surfaces of a rotatable disc, a caliper supported on the bracket and being slidable in the direction of the axis of the disc, an actuating mechanism such as a hydraulic piston-and-cylinder means provided in the caliper and acting on one of the friction pads to apply it against one surface of the disc, a leg portion of the caliper straddling a portion of the circumference of the disc and extending to the rear side of the other friction pad, and a pair of pins secured to the bracket and extending in the direction of the axis of the disc for slidably mounting thereon the caliper.

Usually, the braking torque generated in at least one of the friction pads is transmitted to the bracket through the pair of the pins, thus, the caliper has sometimes been deformed and, smooth sliding movement of the caliper on the pins has sometimes been prevented.

Further, in exchanging the friction pads, it has been required to dismount the disc brake from the vehicle, or to rotate the caliper around one of the pins after removing the other of the pins.

SUMMARY OF THE INVENTION

An object of the present invention is to overcome shortcomings aforementioned and, according to the invention, the caliper straddles a portion of the circumference of the disc, the friction pads are mounted on the bracket such that the braking torque generated on the friction pads in applying the brake is directly transmitted to the bracket and that the friction pads can be dismounted from the bracket by extracting them in the radially outward direction relative to the disc respectively, an opening is formed in the caliper for allowing therethrough the extraction of the friction pads in the radially outward direction, and a pair of retaining pins is provided to extend across the opening in the caliper and in the direction of the axis of the disc, for supporting the friction pads.

BRIEF DESCRIPTION OF THE DRAWINGS

Some preferred embodiments of the invention are, by way of example, illustrated in the drawings, in which.

DETAILED DESCRIPTION OF THE PREFERRED EMBODIMENTS

Figure 2:
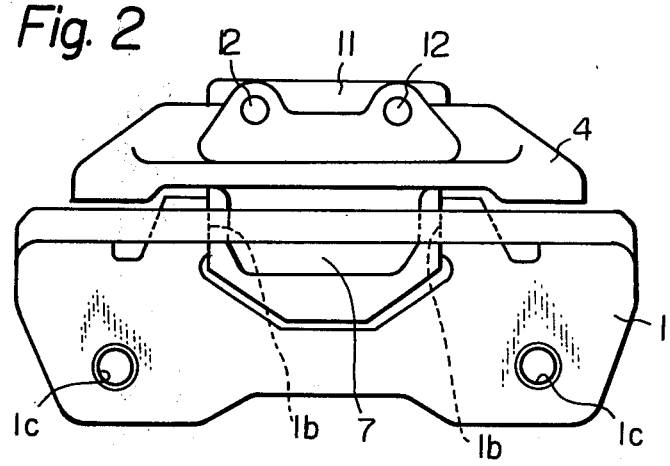
FIG. 2 is a front view of the disc brake of FIG. 1.

The disc brake shown in the drawings comprises a stationary bracket 1 adapted to be secured to a non-rotatable part of a vehicle by means of bolts (not shown) engaging with threaded bores 1c and 1c (FIG. 2). The bracket 1 has a generally L-shaped form as viewed in FIG. 4, and is formed by punching and bending in a press or the like. A pair of pins 2 is secured to the bracket 1 and extend in the direction of the axis of a rotatable disc 3 for slidably mounting thereon a caliper 4. A cylinder 5 is formed in the caliper 4 at one side thereof with respect to the disc 3 for slidably receiving therein a piston 6, and the caliper 4 straddles a portion of the circumference of the disc 3 to define a leg portion 7 at the other side thereof.

Figure 7:
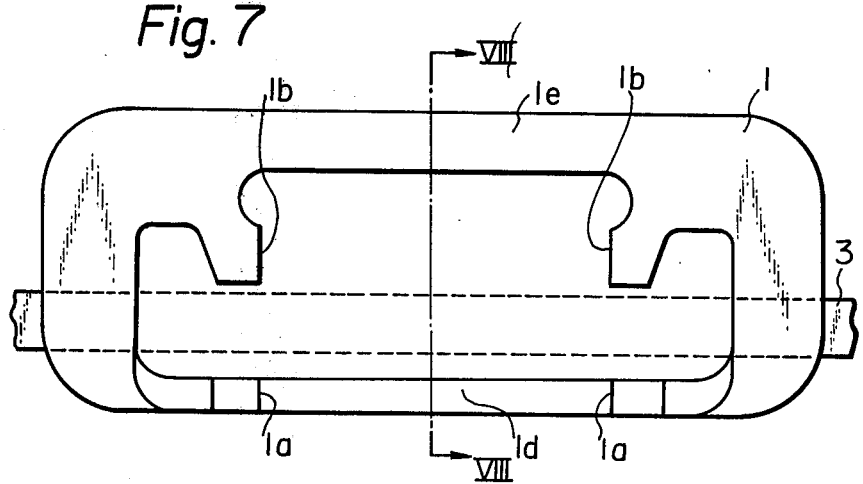
FIG. 7 is a plan view of the bracket of the disc brake of FIG. 1.
Figure 8:
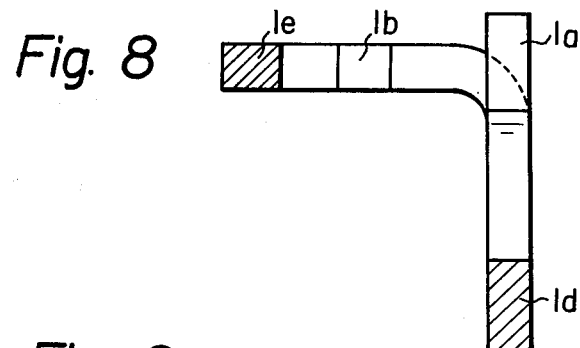
FIG. 8 is a sectional view taken along line VII—VII in FIG. 7.
Figure 9:
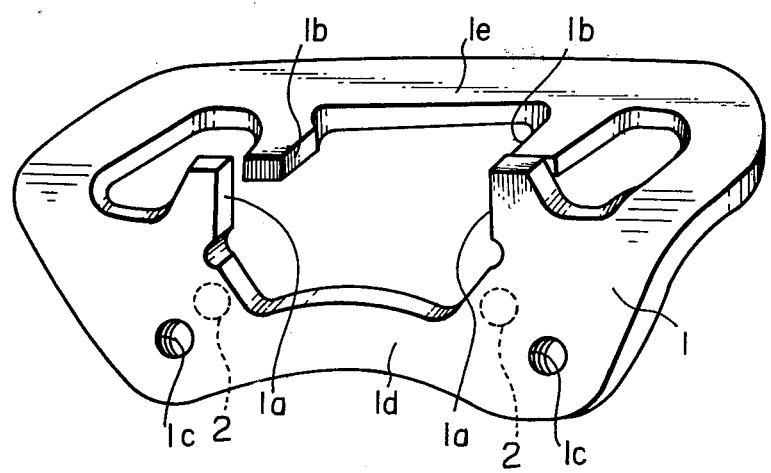
FIG. 9 is a perspective view of the bracket of FIG. 7.

The details of the bracket 1 are shown in FIGS. 7, 8 and 9. There is formed side surfaces 1a and 1a for slidably engaging with side wall portion of a backing plate 9 of an inner or directly actuated friction pad 8 which is disposed adjacent to the piston 6. In applying the brake, the braking torque generated in the friction pad 8 (a friction pad assembly 8, 9) is received by either of the surfaces 1a and 1a according to the direction of the rotation of the disc 3. Similarly, surfaces 1b and 1b are defined as shown in the drawings for slidably receiving therebetween an indirectly actuated or outer friction pad 10. Thus, the braking torque generated in the friction pads in applying the brake is directly transmitted to the stationary bracket 1 and, not through the caliper 4. In fabricating the bracket 1 it is necessary to effect the machining operations on the surfaces 1a and 1b and on the mounting holes 1c, but the remaining portions can be formed by the punching and bending by press work and, therefore, the manufacturing costs can be reduced. It will be noted that the pins 2 are not shown in FIGS. 7 through 9 but, preferably, one end of the pins 2 is forcibly fitted into bores formed in the bracket 1 and, thereafter, welded.

Figure 10:
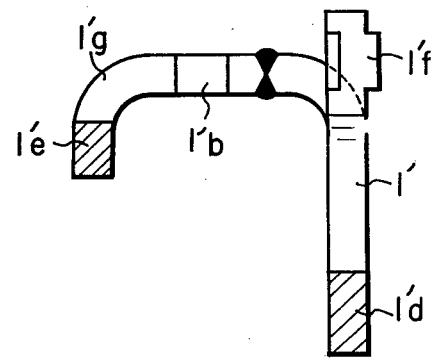
FIG. 10 is a sectional view similar to FIG. 8, but showing a modified form.

FIG. 10 shows a modified bracket 1' wherein surfaces 1'f corresponding to the surfaces 1a in the first embodiment are formed to have the axial length or the length in the direction of the axis of the disc 3 or in the transverse direction in the drawing longer than that of the first embodiment so as to reliably guide the friction pad 8. Further, an end portion 1'e corresponding to the end portion 1e of the first embodiment is bent downwardly at portion 1'g so that the machining operations can easily be effected on surfaces 1'f and surfaces 1'b corresponding to surfaces 1b in the first embodiment. The bracket 1' is formed of two members welded together.

Figure 1:
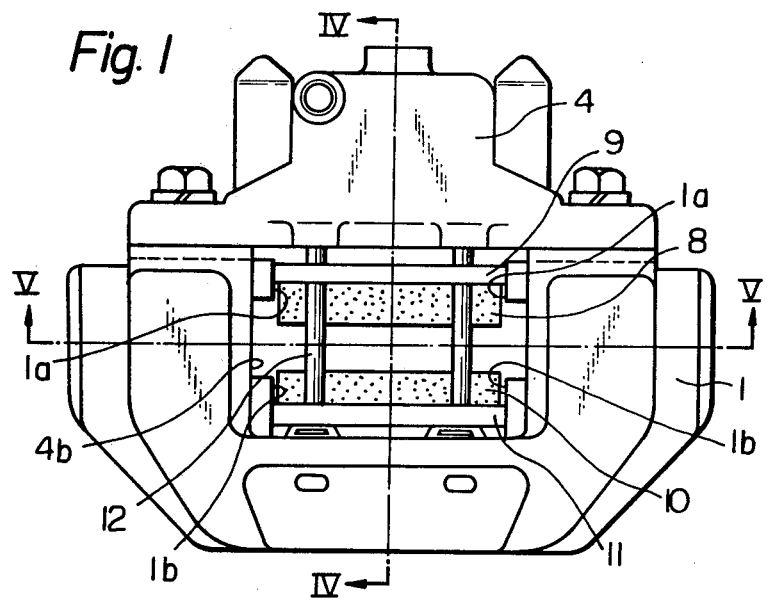
FIG. 1 is a plan view of a disc brake according to the invention.

The caliper 4 has, as shown in FIG. 1, a relatively large opening 4b in the central portion thereof for allowing the insertion or extraction therethrough the friction pads 8 and 10 in the radial direction with respect to the disc 3. There is provided a pair of pins 12 and 12 extending across the upper portion of the opening 4b in the direction of the axis of the disc 3 and being spaced from each other in the direction of the circumference of the disc 3. The pins 12 extend through holes or slots formed in backing plates 9 and 11 of the friction pads 8 and 9 as shown in FIGS. 4 and 5 thereby supporting the friction pads 8 and 9.

Figure 4:
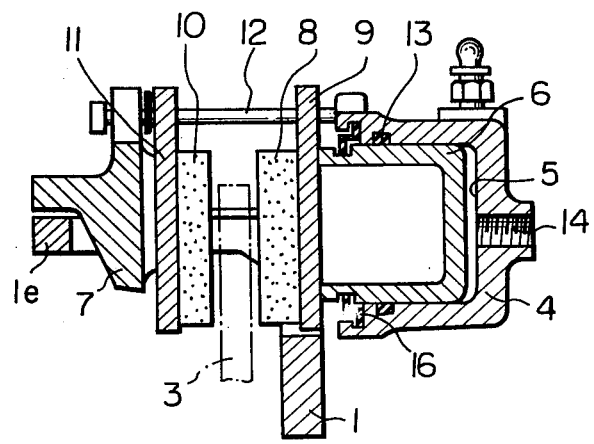
FIG. 4 is a sectional view taken along line IV—IV in FIG. 1.
Figure 5:
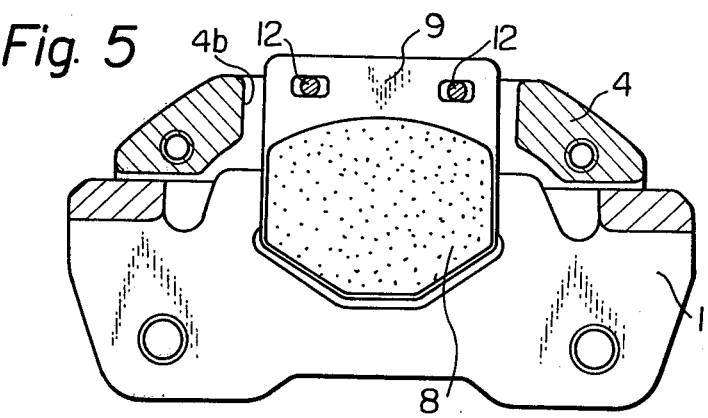
FIG. 5 is a sectional view taken along line V—V in FIG. 1.
Figure 6:
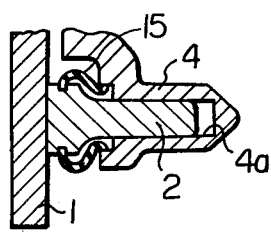
FIG. 6 is a sectional view taken along line VI—VI in FIG. 3.

Shown at 13 in FIG. 4 is a seal ring which liquid-tightly seals the interior of the cylinder 5 and acts to retract the piston 6 into the cylinder 5 in releasing hydraulic pressure which has been applied into the cylinder 5 through a fitting 16. A boot 15 is, as shown in FIG. 6, provided to prevent ingress of dust or water from the sliding portion defined between each of the pins 2 and corresponding bores 4a of the caliper 4. Further, a boot 16 is, as shown in FIG. 4, provided between the piston 6 and the cylinder 5.

In operation, liquid under pressure is supplied into the cylinder 5 through fitting 14, then, the piston 6 moves leftward in FIG. 4 to tightly press the friction pad 8 against one surface of the disc 3, and the reaction thereof moves the caliper 4 rightwardly in FIG. 4. The caliper 4 is slidably supported on a pins 2 and, the leg portion 7 of the caliper 4 tightly presses the friction pad 10 against the other surface of the disc 3. Thus, the disc 3 is clamped between the friction pads 8 and 10 and the braking is effected.

Figure 3:
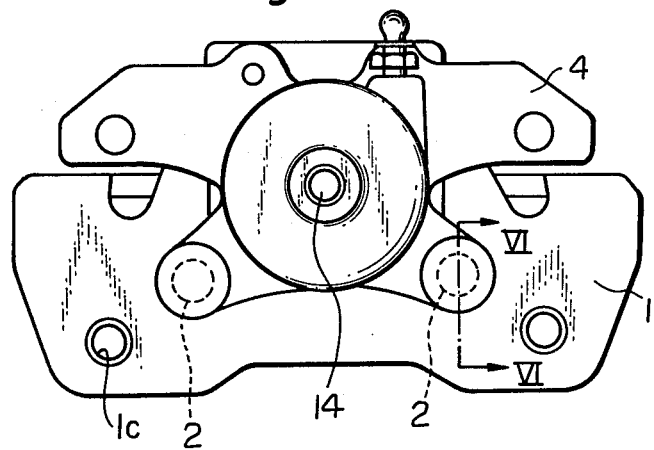
FIG. 3 is a rear view of the disc brake of FIG. 1.

In applying the brake, the braking torque generated in the friction pads 8 and 10 is received on the bracket 1 and, the caliper 4 received the reaction force (clamping force) of the friction pads 8 and 10 being tightly pressed against the disc 3. The pair of pins 2 and the bores 4a of the caliper 4 are formed to have a relatively large clearance so as to avoid a severe machining tolerance and to prevent the damage of the pins 2 or the bores 4 due to the deformation of the bracket 1 or of the caliper 4 in applying the brake. Alternatively, a rubber bushing (not shown) is inserted between the bores 4a and the pins 2. As shown in FIG. 3, the pins 2 in the embodiment are located at the position downward or radially inward of the friction pads 8 and 10, thus the deformation of the bracket 1 at the position of the pins 2 is relatively small.

In exchanging the friction pads 8 and 10 for new friction pads, the retaining pins 12 are removed from the caliper 4. The friction pads can easily be extracted or inserted through the opening 4b.

As heretofore described in detail, the braking torque produced in the friction pads in applying the brake and the clamping force are respectively received on separate members according to the invention, thus, a large braking torque will not act on the caliper, thereby reducing the deformation of the caliper substantially. Therefore, it is possible to substantially reduce the weight of the caliper having a sufficient mechanical strength. Further, the sliding portion between the bracket and the caliper will not receive the braking torque or the clamping force, thus, the sliding movement is smooth and reliable. Further, the sliding portion between the bracket 1 and the caliper 4 can easily be sealed by a boot, thus, generation of the rust or the like can reliably be prevented. Further, the friction pads can easily be exchanged by removing two retaining pins. Further, the bracket 1 can easily be formed of a flat metal plate such as steel.

What is claimed is:

1. A disc brake assembly comprising:
   a substantially L-shaped bracket capable of being secured to a non-rotatable part of a vehicle, said bracket having a portion straddling the periphery of the disc and extending in the direction of the rotational axis of said disc.
   first and second spaced opposed friction pads disposed respectively on the opposite first and second surfaces of a rotatable disc,
   two parallel pins each having one end thereof secured to said bracket and extending parallel to the axis of rotation of said disc,
   a caliper slidably supported on said pair of pins and having a piston therein and adjacent the first side of said disc for urging said first pad against said first side of said disc,
   said caliper further having a leg portion straddling a portion of the periphery of the disc in a direction parallel to the rotational axis of said disc and extending to the second surface of said disc and engaging said second pad for urging said second pad against the second surface of the disc,
   an opening in the caliper extending radially outwardly of said disc for allowing therethrough the extraction of the friction pads in the radially outward direction with respect to the disc, and
   a pair of retaining pins on said caliper extending across the opening in the caliper and in the direction of the rotational axis of the disc and supporting the friction pads,
   said first and second spaced opposed pads having bracket engaging means on each end thereof, said bracket having guiding and supporting surfaces for engaging said pads at said engaging means for guiding said pads toward and away from said disc and for receiving the braking torque generated by the application of the pads to the brake, and
   whereby the said friction pads can be dismounted from the said bracket by removing said retaining pins.

2. The disc brake assembly according to claim 1 wherein said bracket, after straddling the periphery of said disc, is bent downwardly.

* * * * *